United States Patent Office 3,326,688
Patented June 20, 1967

3,326,688
PHOTOGRAPHIC SENSITIZING DYES
Philip W. Jenkins and Leslie G. S. Brooker, Rochester, N.Y., assignors to Eastman Kodak Company, Rochester, N.Y., a corporation of New Jersey
No Drawing. Filed June 10, 1963, Ser. No. 286,450
7 Claims. (Cl. 96—102)

This application relates to imidazo[4,5-b]quinolinium salts and more particularly to new cyanine, new merocyanine and new styryl photographic sensitizing dyes derived from imidazo[4,5-b]quinolinium salts.

Certain dyes of the cyanine, the merocyanine and the styryl series are known to extend the sensitivity of photographic silver halide emulsions. New spectral sensitizing dyes are desired.

It is therefore an object of our invention to provide new imidazo[4,5-b]quinolinium salts which are valuable for use as intermediates for making valuable spectral sensitizing dyes for photography.

Another object is to provide valuable spectral sensitizing dyes for photographic silver halide emulsion layers, said dyes including cyanine dyes, merocyanine dyes and styryl dyes derived from our imidazo[4,5-b]quinolinium salts.

Another object is to provide valuable spectral sensitizing dyes which exhibit a marked tendency to form J-aggregates which absorb light of longer wavelength than the non-aggregated dye molecules would and sensitize silver halide emulsions to light of the wavelengths absorbed. Another object is to provide dyes which have sharp cutting light absorption and sensitizing characteristics.

Another object is to provide syntheses for said dyes. Still another object is to provide photographic elements containing at least one hydrophilic colloid layer containing silver halide and a sensitizing amount of a dye derived from our imidazo[4,5-b]quinolinium salts.

Still other objects will be apparent from a consideration of the following specification and claims.

These and other objects are accomplished according to our invention by making dyes from our new imidazo[4,5-b]quinolinium salts including the intermediates represented by the formula:

I
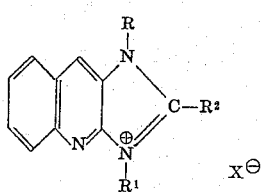

wherein R represents an alkyl group, e.g., methyl, ethyl, propyl, butyl, hexyl, cyclohexyl, dodecyl, octadecyl, benzyl, phenethyl, etc., and an aryl group, e.g., phenyl, p-tolyl, m-tolyl, 3,4-dichlorophenyl, etc.; $R^1$ represents an alkyl group, e.g., methyl, ethyl, propyl, butyl, hexyl, cyclohexyl, octadecyl, carboxymethyl, 3-carboxypropyl, 4-carboxybutyl, sulfomethyl, 2-sulfoethyl, 4-sulfobutyl, etc.; $R^2$ represents an alkyl group, e.g., methyl, β-anilinovinyl, etc.; and $X^\ominus$ represents an acid anion, e.g., chloride, bromide, iodide, thiocyanate, sulfamate, methyl sulfate, ethyl sulfate, perchlorate, p-toluenesulfonate, etc.

The cyanine dyes of our invention include those represented by the formulas:

II
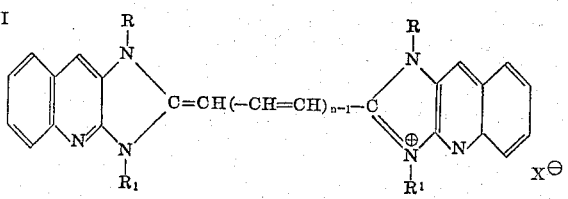

and

III
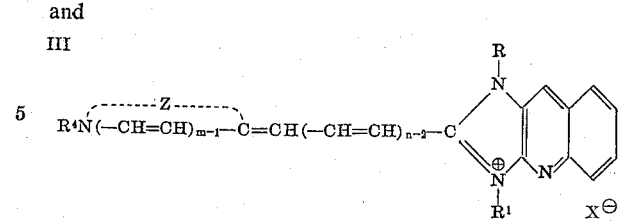

wherein R; $R^1$; and $X^\ominus$ are as defined previously; $n$ represents an integer of from 2 to 4; $R^4$ represents an alkyl group, e.g., methyl, ethyl, n-propyl, n-butyl, n-amyl, isopropyl, isobutyl, benzyl, β-hydroxyethyl, β-acetoxyethyl, etc.; and Z represents the non-metallic atoms required to complete a heterocyclic nucleus such as those selected from the nuclei consisting of those of the thiazole series (e.g.

thiazole,
4-methylthiazole,
4-phenylthiazole,
5-methylthiazole,
5-phenylthiazole,
4,5-dimethylthiazole,
4-(2-thienyl)thiazole,
etc.), those of the benzothiazole series, (e.g. benzothiazole,
4-chlorobenzothiazole,
5-chlorobenzothiazole,
6-chlorobenzothiazole,
7-chlorobenzothiazole,
4-methylbenzothiazole,
5-methylbenzothiazole,
6-methylbenzothiazole,
5-bromobenzothiazole,
6-bromobenzothiazole,
4-phenylbenzothiazole,
5-phenylbenzothiazole,
4-methoxybenzothiazole,
5-methoxybenzothiazole,
6-methoxybenzothiazole,
5-iodobenzothiazole,
6-iodobenzothiazole,
4-ethoxybenzothiazole,
5-ethoxybenzothiazole,
tetrahydrobenzothiazole,
5,6-dimethoxybenzothiazole,
5,6-dioxymethylenebenzothiazole,
5-hydroxybenzothiazole,
6-hydroxybenzothiazole,
etc.), those of the napthothiazole series, (e.g.
α-naphthothiazole,
β-naphthothiazole,
5-methoxy-β-naphthothiazole,
5-ethoxy-β-naphthothiazole,
8-methoxy-α-naphthothiazole,
7-methoxy-α-naphthothiazole, etc.), those of the thionaphtheno-7′,6′,4,5-thiazole series (e.g. 4′-methoxythianaphtheno-7′,6′,4,5-thiazole, etc.), those of the oxazole series (e.g.
4-methyloxazole,
5-methyloxazole,
4-phenyloxazole,
4,5-diphenyloxazole,
4-ethyloxazole,
4,5-dimethyloxazole,
5-phenyloxazole, etc.), those of the benzoxazole series (e.g. benzoxazole,
5-chlorobenzoxazole,
5-methylbenzoxazole,
5-phenylbenzoxazole,
6-methylbenzoxazole,
5,6-dimethylbenzoxazole,
4,6-dimethylbenzoxazole, 5-methoxybenzoxazole,
5-ethoxybenzoxazole,
5-chlorobenzoxazole,
6-methoxybenzoxazole,
5-hydroxybenzoxazole,
6-hydroxybenzoxazole,
etc.) those of the naphthoxazole series (e.g. α-naphthoxazole, β-naphthoxazole, etc.), those of the selenazole series, (e.g. 4-methylselenazole, 4-phenylselenazole, etc.), those of the benzoselenazole series (e.g. benzoselenazole,
5-chlorobenzoselenazole,
5-methoxybenzoselenazole,
5-hydroxybenzoselenazole,
tetrahydrobenzoselenazole,
etc.), those of the naphthoselenazole series (e.g. α-naphthoselenazole, β-naphthoselenazole, etc.) those of the thiazoline series (e.g. thiazoline, 4-methylthiazoline, etc.), those of the 2-quinoline series (e.g. quinoline,
3-methylquinoline,
5-methylquinoline,
7-methylquinoline,
8-methylquinoline,
6-chloroquinoline,
8-chloroquinoline,
6-methoxyquinoline,
6-ethoxyquinoline,
6-hydroxyquinoline,
8-hydroxyquinoline,
etc.), those of the 4-quinoline series (e.g. quinoline, 6-methoxyquinoline,
7-methylquinoline,
8-methylquinoline,
etc.), those of the 1-isoquinoline series (e.g. isoquinoline, 3,4-dihydroisoquinoline, etc.), those of the 3-isoquinoline series (e.g. isoquinoline, etc.), those of the 3,3-dialkylindolenine series (e.g.
3,3-dimethylindolenine,
3,3,5-trimethylindolenine,
3,3,7-trimethylindolenine,
etc.), the 2- and 4-pyridine series (e.g. pyridine, 5-methylpyridine, etc.), those of the imidazole series (e.g., imidazole, 1-alkyl imidazole, 1-alkyl-4-phenylimidazole, 1-alkyl-4,5-dimethylimidazole, etc.), those of the benzimidazole series (e.g., benzimidazole 1-alkyl-benzimidazole, 1-alkyl-4,5-dichlorobenzimidazole, etc.) and those of the naphthimidazole series (e.g. 1-alkyl-α-naphthimidazole, 1-alkyl-β-naphthimidazole, 1-alkyl-5-methoxy-β-naphthimidazole, etc.), and $m$ represents the integer 1 or 2.

The styryl dyes of our invention include those represented by the formula:

IV
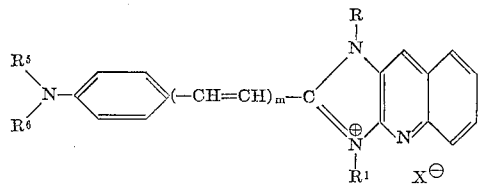

wherein R; R¹; and X⊖ are as defined previously; $m$ represents the integer 1 or 2; and R⁵ and R⁶ each represents the same or a different alkyl group, e.g., methyl, ethyl, 2-cyanoethyl, propyl, butyl, hexyl, etc.

The merocyanine dyes of our invention include those represented by the formula:

V
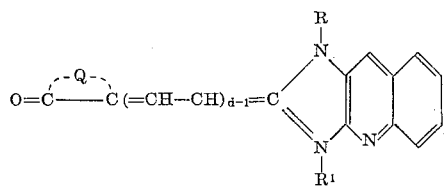

wherein R and R¹ are as defined previously; $d$ represents an integer of 2 or 3; and Q represents the non-metallic atoms required to complete a 5 to 6 membered heterocyclic nucleus such as those of the 2-pyrazolin-5-one series (e.g. 3 - methyl-1-phenyl-2-pyrazolin-5-one, 1 - phenyl - 2 - pyrazolin - 5 - one, 1 - (2-benzothiazolyl)-3-methyl-2-pyrazolin-5-one, etc.), those of the isoxazolone series (e.g. 3-phenyl-5(4H)-isoxazolone, 3-methyl-5(4H)-isooxazolone, etc.), those of the oxindole series, (e.g. 1 - alkyl - 2,3 - dihydro - 2 - oxindoles, etc.), those of the 2,4,6-triketohexahydropyrimidine series (e.g. barbituric acid or 2-thiobarbituric acid as well as their 1-alkyl (e.g. 1-methyl, 1-ethyl, 1-propyl, 1-heptyl, etc.), or 1,3-dialkyl (e.g. 1,3-dimethyl, 1,3-diethyl, 1,3-di-n-propyl, 1,3 - diisopropyl, 1,3 - dicyclohexyl, 1,3-di(β-methoxyethyl), etc.), or 1,3-diaryl (e.g. 1,3-diphenyl, 1,3-di(p-chlorophenyl), 1,3-di(p-ethoxycarbonylphenyl), etc.), or 1-aryl (e.g. 1-phenyl, 1-p-chlorophenyl, 1-p-ethoxycarbonylphenyl, etc.) or 1 - alkyl - 3 - aryl (e.g. 1-ethyl-3-phenyl, 1-n-heptyl-3-phenyl, etc.) derivatives, those of the rhodanine series (i.e. 2-thio-2,4-thiazolidinedione series), such as rhodanine, 3-alkylrhodanines (e.g. 3- ethylrhodanine, 3-allylrhodanine, etc.) or 3-arylrhodanines (e.g. 3-phenylrhodanine, etc.), etc., those of the 2(3H)-imidazo[1,2-a]pyridone series, those of the 5,7 - dioxo-6,7-dihydro-5-thiazolo[3,2-a]pyrimidine series (e.g. 5,7 - dioxo - 3 - phenyl - 6, 7 - dihydro - 5 - thiazole[3,2-a]pyrimidine etc.), those of the 2 - thio - 2, 4 - oxazolidinedione series (i.e. those of the 2-thio-2,4(3H,5H) - oxazoledione series) (e.g. 3 - ethyl - 2-thio - 2, 4-oxazolidinedione, etc.), those of the thianaphthenone series (e.g. 3 - (2H)-thianaphthenone, ect.), those of the 2 - thio - 2,5 - thiazolidinedione series (i.e. the 2 - thio - 2,5(3H,4H) - thiazoledione series) (e.g. 3 - ethyl - 2 - thio - 2,5 - thiazolidinedione, etc.), those of the 2,4 - thiazolidinedione series (e.g. 2,4 - thiazolidinedione, 3 - ethyl - 2,4 - thiazolidinedione, 3-phenyl - 2,4 - thiazolidinedione, 3 - α - naphthyl - 2,4-thiazolidinedione, etc.), those of the thiazolidinone series (e.g. 4 - thiazolidinone, 3 - ethyl - 4 - thiazolidinone, 3 - phenyl - 4 - thiazolidinone, 3 - α - naphthyl - 4-thiazolidinone, etc.), those of the 4 - thiazolinone series (e.g. 2 - ethylmercapto - 4 - thiazolinone, 2-alkylphenylamino - 4 - thiazolinones, 2 - diphenylamino - 4 - thiazolinone, etc.), those of the 2 - amino - 2,4 - oxazolinone (i.e. pseudohydantoin) series, those of the 2,4 - imidazolinedione (hydantoin) series (e.g. 2,4 - imidazolinedione, 3 - ethyl - 2,4 - imidazolinedione, 3 - phenyl - 2, 4 - imidazolinedione, 3 - α - naphthyl - 2,4 - imidazolinedione, 1,3 - diethyl - 2,4 - imidazolinedione, 1 - ethyl-3 - phenyl - 2,4 - imidazolinedione, 1 - ethyl - 3 - α-naphthyl - 2,4 - imidazolinedione, 1,3 - diphenyl - 2,4-imidazolinedione, etc.), those of the 2 - thio - 2,4 - imidazolinedione (i.e. 2 - thiohydantoin) series (e.g. 2-thio-2,4 - imidazolinedione, 3 - ethyl - 2 - thio - 2,4 -imidazolinedione, 3 - phenyl - 2 - thio - 2,4 - imidazolinedione, 3 - α - naphthyl - 2 - thio - 2,4 - imidazolinedione, 1,3 - diethyl - 2 - thio - 2,4 - imidazolinedione, 1 - ethyl-3 - phenyl - 2 - thio - 2,4 - imidazolinedione, 1 - ethyl-3-α - naphthyl - 2 - thio - 2,4 - imidazolinedione, 1,3 - diphenyl - 2 - thio - 2,4 - imidazolinedione, etc.), those of the 5 imidazolinone series (e.g. 2 - propylmercapto-5 - imidazolinone, etc), etc. (especially a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom).

In general, our dyes are produced by heating a mixture of a quaternary salt of Formula I with the appropriate intermediate. The reactants are heated to advantage in any of the suitable solvents used in dye syntheses, including solvents, such as, pyridine, glacial acetic acid, acetic anhydride, ethanol, propanol, dioxane, etc. to a temperature between room temperature and the reflux temperature of the solvent in the mixture. The reaction occurs advantageously in the presence of a basic condensing agent, such as an organic tertiary amine, e.g. triethylamine, tri-n-propylamine, triisopropylamine, tri-n-butylamine, etc., N - methylpiperidine, N - ethylpiperidine, N,N-dimethylaniline, N,N-diethylaniline, etc.

The symmetrical cyanine dyes of Formula II are prepared to advantage by heating a mixture of a compound of Formula I (in which $R^2$ is methyl) with diethoxymethyl acetate (forms carbocyanine), trimethoxypropene (forms dicarbocyanine), 1-anilino-5-phenylimino-1,3-pentadiene HCl (forms tricarbocyanine), etc. preferably in a suitable solvent and in the presence of a basic condensing agent.

The unsymmetrical cyanine dyes of Formula III are prepared advantageously by heating a mixture of a compound of Formula I (in which $R^2$ is methyl) with a compound of the formula:

VI

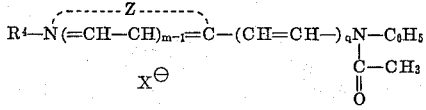

wherein $R^4$, Z, m, and $X^\ominus$ are as defined previously and q represents an integer of from 1 to 2. This is preferably done in a suitable solvent and in the presence of a basic condensing agent.

The styryl dyes of Formula IV are prepared to advantage by heating a mixture of a compound of Formula I (in which $R^2$ is methyl) with the appropriate N,N-disubstituted p-aminobenzaldehyde, or N,N-disubstituted p-aminocinnamaldehyde preferably in a suitable solvent and in the presence of a basic condensing agent.

Our merocyanine dyes are made to advantage by heating a mixture of a compound of Formula I with a compound of formula:

VII

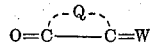

wherein Q is as defined previously and W represents a group selected from two hydrogen atoms or the group

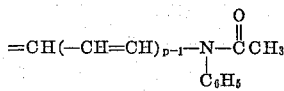

wherein p represents an integer of from 1 to 2, such that when the $R^2$ group in Formula I is methyl, W represents the

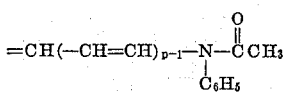

group or when $R^2$ represents the β-anilinovinyl group, W represents two hydrogen atoms.

The syntheses of the following typical dyes will serve to illustrate but not limit our invention.

DYE 1

*3,3'-dimethyl-1,1'-diphenyl-1H-imidazo[4,5-b] quinocarbocyanine iodide*

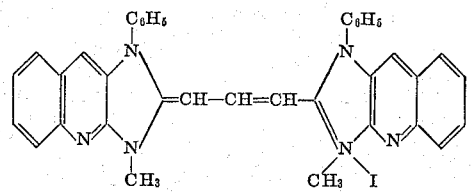

2,3 - dimethyl-1-phenyl-1H-imidazo[4,5-b]quinolinium p-toluenesulfonate (1 mol., 4.5 g.), diethoxymethyl acetate (1 mol.+700%, 6.5 g.), and triethylamine (1 mol., 1.0 g.) were dissolved in pyridine (10 ml.), and the solution was heated under reflux for ten minutes. The dye was isolated as an oil after the addition of water to the reaction mixture. The oil was dissolved in methanol (50 ml.), and this solution was added to a solution of potassium iodide (4 g.) in water (50 ml.). The crude product was isolated by filtration. After boiling with acetone and recrystallization once from methanol, the yield of pure dye was 0.1 g. (3%), M.P. 277.5–278.5° C. dec.

DYE 2

*1,1',3,3'-tetraethyl-1H-imidazo[4,5-b]quinocarbocyanine iodide*

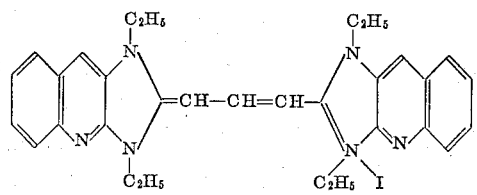

1,3-diethyl-2-methyl-1H-imidazo[4,5-b]quinolinium iodide (1 mol., 1.5 g.) and diethoxymethyl acetate (1 mol.+300%, 1.3 g.) were dissolved in pyridine (10 ml.), and the solution was heated under reflux for ten minutes. The reaction mixture was cooled and the dye was precipitated by the addition of water (150 ml.). The dye suspension was chilled overnight, and the crude product was isolated by filtration. After one recrystallization from methanol, the yield of pure dye was 0.14 g. (11%), M.P. 302.5–303.5° C. dec.

DYE 3

*1,3,3'-triethyl-1H-imidazo[4,5-b]quino-oxacarbocyanine iodide*

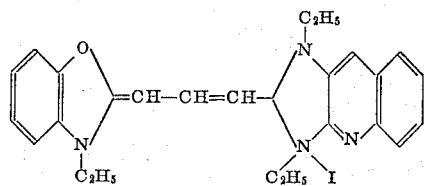

1,3-diethyl-2-methyl-1H-imidazo[4,5-b]quinolinium iodide (1 mol., 0.9 g.), 2-β-acetanilidovinyl-3-ethylbenzoxazolium iodide (1 mol., 1.1 g.), and triethylamine (1 mol., 0.25 g.) were dissolved in ethanol (10 ml.), and the solution was heated under reflux for twenty minutes. The reaction mixture was cooled, and the crude product was precipitated by the addition of water (150 ml.). The dye suspension was chilled overnight, and the crude product was isolated by filtration. After one recrystallization from methanol, the yield of pure dye was 0.1 g. (8%), M.P. 245.0–246.0° C. dec.

DYE 4

*1,3,3'-triethyl-1H-imidazo[4,5-b]quinothiacarbocyanine iodide*

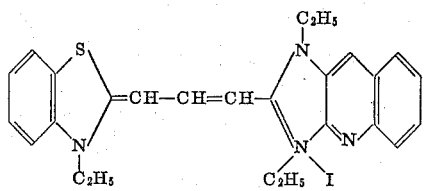

1,3-diethyl-2-methyl-1H-imidazo[4,5-b]quinolinium iodide (1 mol., 0.9 g.), 2-β-acetanilidovinyl-3-ethylbenzothiazolium iodide (1 mol., 1.1 g.) and triethylamine (1 mol., 0.25 g.) were dissolved in ethanol (10 ml.), and the solution was heated under reflux for ten minutes. The reaction mixture was cooled, and the dye was precipitated by the addition of water (150 ml.). The dye suspension was chilled overnight, and the crude product was collected by filtration. After two recrystallizations from methanol, the yield of pure dye was 0.3 g. (22%), M.P. 251.0–252.0° C. dec.

DYE 5

*1,1'3-triethyl-1H-imidazo[4,5-b]quino-2'-carbocyanine iodide*

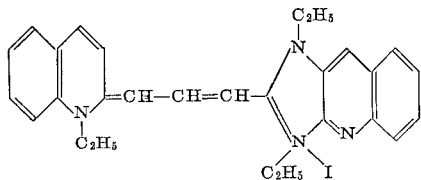

1,3-diethyl-2-methyl - 1H - imidazo[4,5-b]quinolinium iodide (1 mol., 0.9 g.), 2-β-anilinovinyl-1-ethylquinolinium iodide (1 mol., 1.0 g.), acetic anhydride (1 mol.+100%, 0.5 g.), and triethylamine (1 mol.+100%, 0.75 g.) were dissolved in ethanol (10 ml.), and the solution was heated under reflux for ten minutes. The reaction mixture was cooled, and the dye was precipitated by the addition of water (150 ml.). The dye suspension was chilled overnight, and the crude product was isolated by filtration. After two recrystallizations from methanol, the yield of pure dye was 0.35 g. (26%), M.P. 265.5–266.5° C. dec. (inserted at 180° C.).

DYE 6

*3-ethyl-1',3',3'-trimethyl-1-phenyl-1H-imidazo[4,5-b]quinoindocarbocyanine iodide*

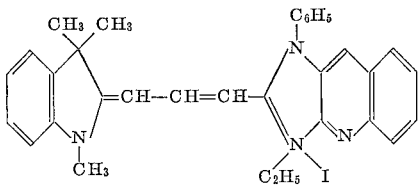

3-ethyl - 2 - methyl-1-phenyl-1H-imidazo[4,5-b]quinolinium iodide (1 mol., 1.5 g.), 2-β-acetanilidovinyl-1,3,3-trimethyl-3H-indolium iodide (1 mol., 1.6 g.), and triethylamine (1 mol., 0.36 g.) were dissolved in ethanol (15 ml.), and the solution was heated under reflux for fifteen minutes. The reaction mixture was cooled, and the crude product was isolated by filtration, washed with acetone, and dried. After two recrystallizations from methanol, the yield of pure dye was 0.8 g. (39%), M.P. 312.5–213.5° C. dec. (inserted at 260° C.).

DYE 7

*3,3'-diethyl-1,1'-diphenyl-1H-imidazo[4,5-b]quinodicarbocyanine iodide*

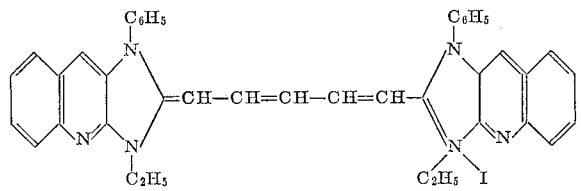

3-ethyl - 2 - methyl-1-phenyl-1H-imidazo[4,5-b]quinolinium iodide (1 mol., 2.1 g.) and trimethoxypropene (1 mol.+100%, 0.65 g.) were dissolved in pridine (15 ml.), and the solution was heated under reflux for thirty minutes. The reaction mixture was cooled, and the dye was precipitated by addition of water (150 ml.). The dye suspension was chilled overnight, and the crude product was isolated by filtration, washed with water, and dried. After one recrystallization from methanol, the yield of pure dye was 0.2 g. (7%), M.P. 263.5–264.5° C. dec.

DYE 8

*1,1',3,3'-tetraethyl-1H-imidazo[4,5-b]quinotricarbocyanine iodide*

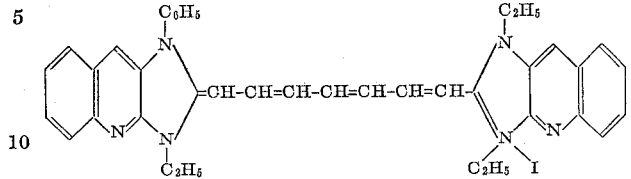

1,3-diethyl - 2 - methyl-1H-imidazo[4,5-b]quinolinium iodide (1 mol., 1.5 g.) and 1-anilino-5-phenylimino-1,3-pentadiene hydrochloride (1 mol., 1.2 g.) were dissolved in hot acetic anhydride. Triethylamine (1 mol., 0.4 g.) was added, and the solution was heated under reflux for ten minutes. The reaction mixture was cooled, and the crude product was precipitated by the addition of diethyl ether. After chilling, the ether was decanted. The residual semicrystalline gum was combined with 1,3-diethyl-2-methyl-1H-imidazo[4,5-b]quinolinium iodide (1 mol., 1.5 g.) and triethylamine (1 mol., 1.5 g.). This mixture was dissolved in ethanol (20 ml.), and the solution was heated under reflux for twenty minutes. The reaction mixture was chilled, and the crude product was isolated by filtration, washed with methanol, and dried. After one recrystallization from cresol and methanol, the yield of pure dye was 0.2 g. (7%), M.P. 263.5–264.5° C. dec.

DYE 9

*2-p-dimethylaminostyryl-3-ethyl-1-phenyl-1H-imidazo[4,5-b]quinolinium iodide*

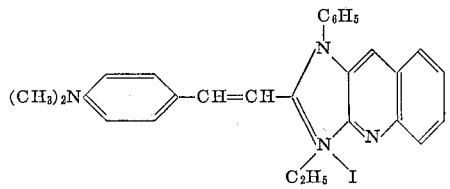

3-ethyl - 2 - methyl-1-phenyl-1H-imidazo[4,5-b]quinolinium iodide (1 mol., 1.5 g.) p-dimethylaminobenzaldehyde (1 mol.+50%, 0.8 g.), and piperidine (2 drops) were dissolved in ethanol (15 ml.), and the solution was heated under reflux for 2.5 hours. The reaction mixture was chilled overnight, and the crude product was isolated by filtration, washed with acetone, and dried. After two recrystallizations from methanol, the yield of pure dye was 0.3 g. (15%), M.P. 288.5–289.5° C. dec. (inserted at 230° C.).

DYE 10

*2-(4-p-dimethylaminophenyl-1,3-butadienyl)-3-ethyl-1-phenyl-1H-imidazo[4,5-b]quinolinium iodide*

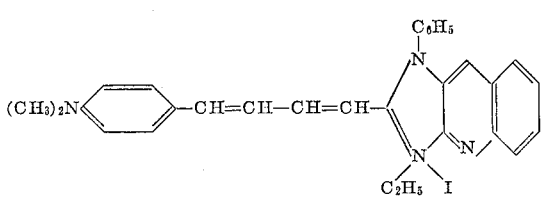

3 - ethyl - 2 - methyl - 1-phenyl-1H-imidazo[4,5b]quinolinium iodide (1 mol., 1.5 g.) and p-dimethylaminocinnamaldehyde (1 mol.+50%, 0.95 g.) were dissolved in acetic anhydride (15 ml.), and the solution was heated under reflux for thirty minutes. The reaction mixture was chilled overnight, and the crude product was isolated by filtration, washed with acetone, and dried. After two recrystallizations from methanol, the yield of pure dye was 0.25 g. (12%), M.P. 261.5–262.5° C. dec. (inserted at 230° C.).

DYE 11

3-ethyl-5-[(1,3-diethyl-1H-imidazo[4,5-b]quinol-2(3H)-ylidene)ethylidene]-2-thio-2,4-oxazolidinedione

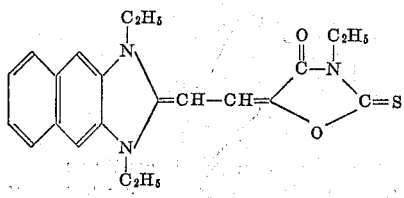

1,3 - diethyl - 2-methyl-1H-imidazo[4,5-b]quinolinium iodide (1 mol., 1.0 g.), 5-acetanilidomethylene-3-ethyl-2-thio-2,4-oxazolidinedione (1 mol., 0.8 g.), acetic anhydride (1 mol., 0.3 g.), and triethylamine (1 mol., 0.55 g.) were dissolved in pyridine (10 ml.), and the solution was heated under reflux for twenty minutes. The reaction mixture was chilled and diluted with methanol (50 ml.). The solution was chilled overnight, and the crude product was isolated by filtration, washed with methanol, and dried. After two recrystallizations from pyridine and methanol, the yield of pure dye was 0.25 g. (23%), M.P. 258.0–259.0° C. dec.

DYE 12

5-[(1,3-diethyl-1H-imidazo[4,5-b]quinol-2(3H)-ylidene)ethylidene]-3-ethylrhodanine

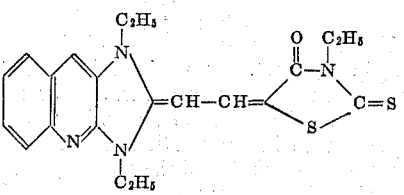

1,3 - diethyl - 2-methyl-1H-imidazo[4,5-b]quinolinium iodide (1 mol., 0.9 g.), 5-acetanilidomethylene-3-ethylrhodanine (1 mol., 0.75 g.) and triethylamine (1 mol., 0.25 g.) were dissolved in pyridine (10 ml.), and the solution was heated under reflux for ten minutes. The reaction mixture was cooled and diluted with methanol (50 ml.) containing piperidine (5 drops). The solution was chilled, and the crude product was isolated by filtration. After two recrystallizations from pyridine and methanol, the yield of pure dye was 0.5 g. (50%), M.P. 249.0–250.0° C. dec.

DYE 13

3-ethyl-5-[(3-ethyl-1-phenyl-1H-imidazo[4,5-b]quinol-2(3H)-ylidene)ethylidene]-1-phenyl-2-thiohydantoin

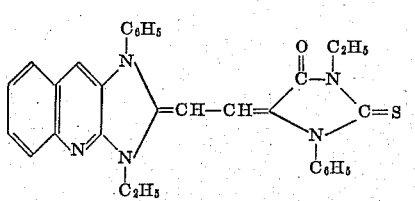

2 - β - anilinovinyl-3-ethyl-1-phenyl-1H-imidazo[4,5-b]quinolinium iodide (1 mol., 1.4 g.), 3-ethyl-1-phenyl-2-thiohydantoin (1 mol., 0.6 g.), acetic anhydride (1 mol.+200%, 0.8 g.), and triethylamine (1 mol.+200%, 1.1 g.) were dissolved in ethanol (15 ml.), and the solution was heated under reflux for fifteen minutes. The mixture was chilled overnight, and the crude product was isolated by filtration, washed with methanol, and dried. After two recrystallizations from pyridine and methanol, the yield of pure dye was 0.8 g. (57%), M.P. 225.5–226.5° C. dec.

DYE 14

1 - ethyl-5-[(3-ethyl-1-phenyl-1H-imidazo[4,5-b]quinol-2(3H)-ylidene)ethylidene]-2-thiobarbituric acid

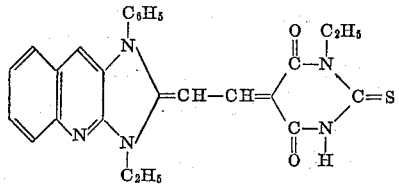

2 - β - anilinovinyl-3-ethyl-1-phenyl-1H-imidazo[4,5-b] quinolinium iodide (1 mol., 1.75 g.), 1-ethyl-2-thiobarbituric acid (1 mol., 0.6 g.), acetic anhydride (1 mol.+130%, 0.8 g.), and triethylamine (1 mol.+130%, 1.15 g.) were dissolved in ethanol (15 ml.), and the solution was heated under reflux for fifteen minutes. The mixture was chilled overnight, and the crude product was isolated by filtration, washed with methanol, and dried. After two recrystallizations from pyridine and methanol, the yield of pure dye was 1.2 g. (87%), M.P. >310° C.

DYE 15

5 - [(3 - ethyl-1-phenyl-1H-imidazo[4,5-b]quinol-2(3H)-ylidene)ethylidene]-3-phenyl-2,4-thiazolidinedione

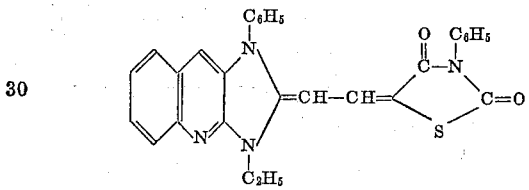

2 - β - anilinovinyl-3-ethyl-1-phenyl-1H-imidazo[4,5b] quinolinium iodide (1 mol., 1.4 g.), 3-phenyl-2,4-thiazolidindione (1 mol., 0.55 g.), acetic anhydride (1 mol.+200%, 0.8 g.), and triethylamine (1 mol.+200%, 1.1 g.) were dissolved in ethanol (15 ml.), and the solution was heated under reflux for fifteen minutes. The reaction mixture was called overnight, and the crude product was isolated by filtration, washed with methanol, and dried. After two recrystallizations from pyridine and methanol, the yield of pure dye was 0.55 g. (42%), M.P. >300° C.

DYE 16

3 - carboxymethyl-5-[(3-ethyl-1-phenyl-1H-imidazo[4,5b] quinol - 2(3H) - ylidene)ethylidene]-2-thio-2,4-oxazolidinedione

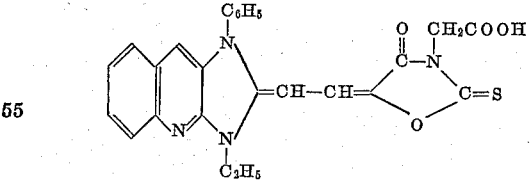

2 - β - anilinovinyl-3-ethyl-1-phenyl-1H-imidazo[4,5-b] quinolinium iodide (1 mol., 1.7 g.), 3-carboxymethyl-2-thio-2,4-oxazolidinedione (1 mol.+100%, 1.2 g.), acetic anhydride (1 mol.+200%, 1.0 g.), and triethylamine (1 mol.+200%, 1.3 g.) were dissolved in ethanol (15 ml.), and the solution was heated under reflux for twenty minutes. The reaction mixture was diluted with glacial acetic acid (40 drops) and anhydrous ether and chilled. The ether was decanted, and the residual oil was boiled with methanol (10 ml.). Glacial acetic acid was added, and after chilling overnight, the crude product was isolated by filtration, washed with methanol, and dried. After two recrystallizations carried out by dissolving the product in hot methanol containing triethylamine followed by acidification with acetic acid and chilling, the yield of pure dye was 0.25 g. (16%), M. P. 247.0–249.0° C. dec.

DYE 17

5-[(3-ethyl-1-phenyl-1H-imidazo[4,5-b]quinol-2(3H)-ylidene)ethylidene]-3-(2-sulfoethyl)-2-thio-2,4-oxazolidinedione

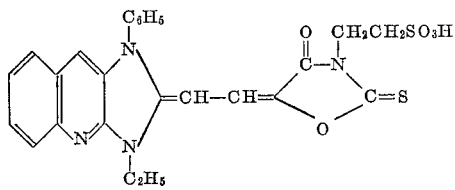

2-β-anilinovinyl-3-ethyl-1-phenyl-1H-imidazo[4,5-b]quinolinium iodide (1 mol., 1.7 g.), 3-(2-sulfoethyl)-2-thio-2,4-oxazolidinedione (1 mol.+50%, 1.1 g.), acetic anhydride (1 mol.+200%, 1.0 g.), and triethylamine (1 mol.+200%, 1.3 g.) were dissolved in ethanol (15 ml.), and the solution was heated under reflux for twenty minutes. The reaction mixture was cooled to room temperature and concentrated hydrochloric acid (40 drops) was added. The solution was chilled overnight and the crude product was isolated by filtration and dried. After two recrystallizations carried out by dissolving the dye in hot methanol containing triethylamine, followed by precipitation by the addition of methanol containing hydrochloric acid, the yield of pure dye was 0.65 g. (37%), M.P. 291.5–292.5° C. dec. (inserted at 230° C.).

DYE 18

3-ethyl-5-[(3-ethyl-1-phenyl-1H-imidazo[4,5-b]quinol-2(3H)-ylidene)-2-butenylidene]rhodanine

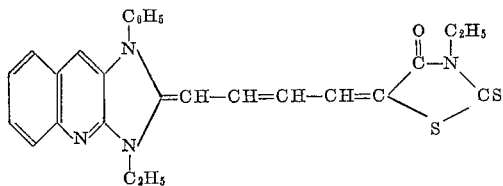

3-ethyl-2-methyl-1-phenyl-1H-imidazo[4,5-b]quinolinium iodide (1 mol., 1.25 g.), 5-acetanilidoallylidene-3-ethylrhodanine (1 mol., 1.0 g.), acetic anhydride (excess, 0.6 g.), and triethylamine (excess, 0.6 g.) were dissolved in pyridine (15 ml.), and the solution was heated under reflux for fifteen minutes. The reaction mixture was chilled and diluted with methanol (75 ml.). The solution was chilled overnight, and the crude product was isolated by filtration, washed with methanol, and dried. The product was recrystallized once from pyridine and methanol containing piperidine and then extracted four times with small portions of ligroin (B.P. 100–115° C., 50–65 ml. portions). After one recrystallization from a large amount of ligroin (B.P. 100–115° C.), the yield of purified dye was 0.15 g. (6%), M.P. 235.5–236.5° C. dec.

The following synthesis will illustrate the preparation of representative imidazo[4,5-b]quinolinium salts of our invention.

2-β-anilinovinyl-3-ethyl-1-phenyl-1H-imidazo[4,5-b]quinolinium iodide

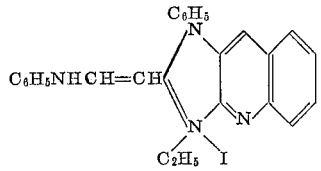

3-ethyl-2-methyl-1-phenyl-1H-imidazo[4,5-b]quinolinium iodide (1 mol., 6.6 g.) and ethyl isoformanilide (1 mol.+400%, 12.0 g.) were dissolved in n-butanol (30 ml.), and the solution was heated under reflux for thirty minutes. The reaction mixture was chilled overnight. The crude product was isolated by filtration, washed repeatedly with anhydrous ether, and dried. After one recrystallization from methanol, the yield of pure dye was 6.15 g. (75%), M.P. 263.0–264.0° C. dec.

2,3-dimethyl-1-phenyl-1H-imidazo[4,5-b]quinolinium p-toluenesulfonate

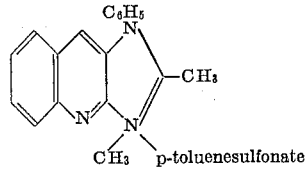

2,3-dimethyl-4-oxo-1-phenyl-2-imidazolinium p-toluenesulfonate (1 mol., 3.6 g.), o-aminobenzaldehyde (1 mol., 1.2 g.), and glacial acetic acid (15 ml.) were mixed and heated under reflux for 2.2 hours. The reaction mixture was concentrated to dryness under reduced pressure. After mixing the residue with benzene, the benzene was removed under reduced pressure. The product was isolated as a non-crystalline glass. This product was used, without further purification, in dye condensations.

3-ethyl-2-methyl-1-phenyl-1H-imidazo[4,5-b]quinolinium iodide

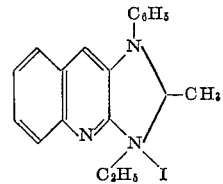

3-ethyl-2-methyl-4-oxo-1-phenyl-2-imidazolinium iodide (1 mol., 13.2 g.), o-aminobenzaldehyde (1 mol., 4.8 g.), and glacial acetic acid (30 ml.) were mixed and heated on a steam bath for 3.5 hours. The hot reaction mixture was poured into a solution of potassium iodide (6.4 g.) in water (45 ml.) and the resulting mixture was cooled overnight. The water was decanted, and the residual oil was stirred repeatedly with ether. The oil was then crystallized from ethanol, isolated by filtration, and dried. After two recrystallizations from ethanol, the yield of pure product was 2.9 g. (18%), M.P. 230.5–232.5° C.

1,3-diethyl-2-methyl-1H-imidazo[4,5-b]quinolinium iodide

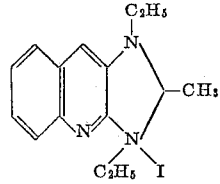

1,3-diethyl-2-methyl-4-oxo-2-imidazolinium iodide (1 mol.+20%, 50.8 g.) was dissolved in hot glacial acetic acid (20 ml.). o-Aminobenzaldehyde (1 mol. 18.2 g.) was added to the solution followed by glacial acetic acid (10 ml.), and the mixture was heated on a steam bath for 3.2 hours. The hot reaction mixture was poured with stirring into boiling water (250 ml.). The hot solution was filtered, and potassium iodide (50 g.) was dissolved in the filtrate. The crude product precipitated from the aqueous solution upon cooling and was collected by filtration. After drying, the product was boiled with acetone. The acetone mixture was cooled, filtered, and the precipitate was washed with acetone and dried. Recrystallization from ethanol gave 9.4 g. (17%) of straw-colored needles, M.P. 186.0–187.5° C.

The imidazolinium salts used to prepare our new imidazo[4,5-b]quinolinium salts were prepared by conventional methods from the parent 2-imidazolin-4-ones made as described by Brunken and Zeh in East German patents 8052 and 9740, both issued in 1955.

For the preparation of photographic emulsions, the new dyes of the invention are advantageously incorporated in the washed, finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which the solvent selected should have no deleterious effect on the ultimate light-sensitive materials. Methanol isopropanol, pyridine, etc., alone or in combination have proven satisfactory as solvents for the majority of our new dyes. The type of silver halide emulsions that are sensitized with our dyes include any of those prepared with hydrophilic colloids that are known to be satisfactory for dispersing light-sensitive silver halides, for example, emulsions prepared with hydrophilic colloids, such as, natural materials, e.g., gelatin, albumin, agar-agar, gum arabic, alginic acid, etc., and synthetic hydrophilic resins, e.g., polyvinyl alcohol, polyvinyl pyrrolidone, cellulose ethers, partially hydrolyzed cellulose acetate, etc.

The concentration of our new dyes in the emulsion can vary widely, i.e., from about 5 to about 100 mg. per liter of flowable emulsion. The specific concentration will vary according to the type of light-sensitive material in the emulsion and according to the effects desired. The most advantageous dye concentration for any given emulsion can be readily determined by making the tests and observations customarily used in the art of emulsion making.

To prepare a gelatino-silver halide emulsion sensitized with one of our new dyes, the following procedure is satisfactory: A quantity of the dye is dissolved in a suitable solvent, and a volume of this solution containing from 5 to 100 mgs. of dye is slowly added with intimate mixing to about 1,000 cc. of a gelatino-silver halide emulsion. With most of our dyes, 10 to 20 mgs. of dye per liter of emulsion suffices to produce the maximum sensitizing effect with the ordinary gelatino-silver bromide (including bromoiodide and chlorobromide) emulsions. With fine-grain emulsions which include most of the ordinary employed gelatino-silver chloride emulsions, somewhat larger concentrations of dye may be necessary to secure the optimum sensitization. While the preceding has delt with emulsions comprising gelatin, it will be understood that these remarks apply generally to any emulsions in which a part or all of the gelatin is substituted by another suitable hydrophilic colloid such as previously mentioned.

The above statements are only illustrative and are not to be understood as limiting our invention in any sense, as it will be apparent that our dyes can be incorporated by other methods in many of the emulsions customarily used in the art. For instance, the dyes can be incorporated by bathing a plate of film bearing an emulsion, in a solution of the dye.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. patents to W. D. Baldsiefen, 2,540,085, granted Feb. 6, 1951; R. E. Damschroder, 2,597,856, granted May 27, 1952, and H. C. Yutzy et al., 2,597,915, granted May 27, 1952), various palladium compounds, such as palladium chloride (W. D. Baldsiefen, U.S. 2,540,086, granted Feb. 6, 1951), potassium chloropalladate (R. E. Stauffer et al., U.S. 2,598,079, granted May 27, 1952), etc., or mixture of such sensitizers; antifoggants, such as ammonium chloroplatinate (A. P. H. Trivelli et al., U.S. 2,566,245, granted Aug. 28, 1951), ammonium chloroplatinite (A. P. H. Trivelli et al., U.S. 2,566,263, granted Aug. 28, 1951), benzotriazole, nitrobenzimidazole, 5-nitroindazole, benzidine, mercaptans, etc. (see Mees, "The Theory of the Photographic Process," Macmillan Pub. 1942, page 460), or mixtures thereof; hardeners, such as formaldehyde (A. Miller, U.S. 1,763,533, granted June 10, 1930), chrome alum (U.S. 1,763,533), glyoxal (J. Brunken, U.S. 1,870,354, granted Aug. 9, 1932), dibromoacrolein (O. Block, et al., Br. 406,750, accepted Mar. 8, 1934), etc.; color couplers, such as those described in I. F. Salminen et al., U.S. Patent 2,423,730, granted July 7, 1947, Spence and Carroll, U.S. Patent 2,640,776, issued June 2, 1953, etc.; or mixtures of such addenda. Dispersing agents for color couplers, such as those set forth in U.S. patents to E. E. Jelley et al., 2,322,027, granted June 15, 1943, and L. D. Mannes et al., 2,304,940, granted Dec. 15, 1942, can also be employed in the above-described emulsions.

Our emulsions are coated to advantage on any of the materials used for photographic elements including, for example, paper, glass, cellulose acetate, cellulose nitrate, synthetic film-forming resins, e.g., the polyesters, the polyamides, polystyrenes, etc.

The following example will serve to further illustrate our invention by showing the sensitizing effects of representative dyes of our invention on silver halide emulsions.

*Example 1*

Sensitizing amounts of the dyes (indicated in the following table), dissolved in suitable solvents, were each added to separate portions of a gelatino-silver halide emulsion (silver bromoiodide or silver chlorobromide). After digestion at 50° C. for 10 minutes, the emulsions were coated at a coverage of 432 mg. of silver per square foot an cellulose acetate film support. A sample of each coating was exposed with a IB type sensitometer and to a wedge spectograph, processed for 4 minutes in a conventional developer, fixed in the usual way, washed and dried. The following table lists the sensitizing range and sensitizing maximum (both in m$\mu$) produced in the emulsions with our representative dyes.

| Dye | Silver Halide in Emulsion | Sensitizing Range in m$\mu$ | Sensitizing Maximum in m$\mu$ |
| --- | --- | --- | --- |
| 1 | Silver bromoiodide | 520–665 | 1 600 |
| 2 | ----do---- | To 680 | 630 |
| 3 | ----do---- | To 615 | 550 |
| 4 | ----do---- | To 670 | 590, 630 |
| 5 | ----do---- | To 720 | 580, 670 |
| 6 | ----do---- | 510–625 | 590 |
| 7 | ----do---- | 620–760 | 710 |
| 8 | ----do---- | To 630 | 585 |
| 9 | ----do---- | To 730 | (²) |
| 10 | ----do---- | To 630 | 570 |
| 11 | ----do---- | To 680 | 610 |
| 12 | ----do---- | To 640 | 545, 585 |
| 13 | Silver chlorobromide | To 580 | 540 |
| 14 | ----do---- | 490–630 | 590 |
| 15 | ----do---- | To 600 | 520, 570 |
| 16 | Silver bromoiodide | To 635 | 570 |
| 17 | ----do---- | 560–750 | 700 |
| 18 | Silver chlorobromide | | |

¹ Ghost at 655.
² Not definite.

The new imidazo[4,5-b]quinolinium salts of our invention are valuable for making photographic silver halide sensitizing dyes of the cyanine type, styryl type and merocyanine type. These dyes are valuable for extending the light-sensitivity of the silver halide emulsions to longer wavelengths.

The invention has been described in detail with particular reference to preferred embodiments thereof but it will be understood that variations and modifications can be effected within the spirit and scope of the invention as described hereinabove and as defined in the appended claims.

We claim:

1. A light-sensitive photographic silver halide emulsion containing a dye derived from an imidazo[4,5-b]quinolinium salt, said dye being selected from the dyes having the formulas

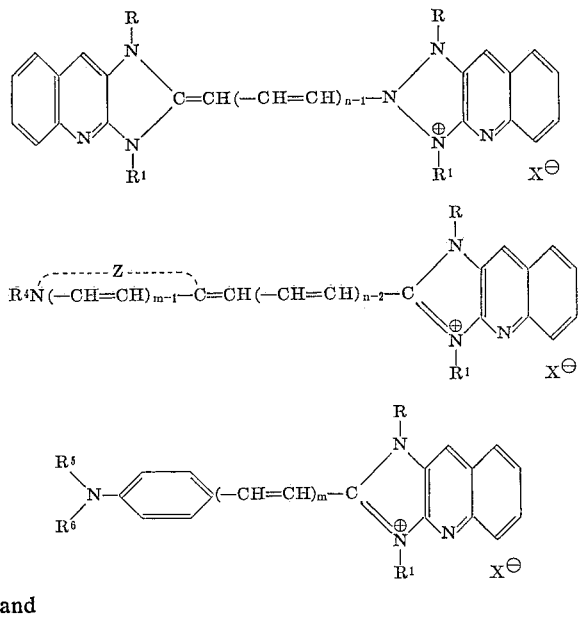

and

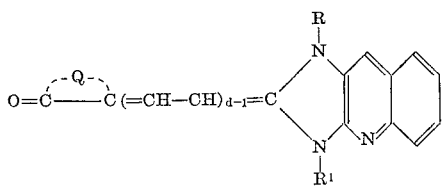

wherein R represents a group selected from the class consisting of an alkyl group and an aryl group; and $R^1$ represents an alkyl group; $R^4$ represents an alkyl group, $n$ represents an integer of from 2 to 4; $X^\ominus$ represents an acid anion; Z represents the nonmetallic atoms required to complete a heterocyclic nucleus selected from the nuclei consisting of those of the thiazole series, those of the benzothiazole series, those of the naphthothiazole series, those of the thianaphtheno-7' 6',4,5-thiazole series, those of the oxazole series, those of the benzoxazole series, those of the naphthoxazole series, those of the selenazole series, those of the benzoselenazole series, of the naphthoselenazole series, those of the thiazoline series, those of the 2-quinoline series, those of the 4-quinoline series, those of the 1-isoquinoline series, those of the 3-isoquinoline series, those of the 3,3-dialkylindolenine series, those of the 2-pyridine series, those of the 4-pyridine series, those of the imidazole series, those of the benzimidazole series and those of the naphthiamidazole series $R^5$ and $R^6$ each represent an alkyl group; $m$ represents an integer of 1 to 2; and Q represents the non-metallic atoms required to complete a heterocyclic nucleus selected from the nuclei consisting of those of the 2-pyrazolin-5-one series, those of the isoxazolone series, those of the oxindole series, those of the 2,4,6-triketohexahydropyrimidine series, those of the rhodanine series, those of the 2(3H)-imidazole[1,2-a]pyridone series, those of the 5,7-dioxo-6,7-dihydro-5-thiazolo-[3,2-a]pyrimidine series, those of the 2-thio-2,4-oxazolidinedione series, those of the thianaphthenone series, those of the 2-thio-2,5-thiazolidinedione series, those of the 2,4-thiazolidinedione series, those of the thiazolidinone series, those of the 4-thiazolinone series, those of the 2-imino-2,4-oxazolinone series, those of the 2,4-imidazolinedione series, those of the 2-thio-2,4-imidazolinedione series, those of the 5-imidazolinone series: and $d$ represents an integer of from 2 to 3.

2. A light-sensitive photographic silver halide emulsion containing silver halide and the dye 1,1',3,3'-tetraethyl-1H-imidazo[4,5-b]quinocarbocyanine iodide.

3. A light-sensitive photographic silver halide emulsion containing silver halide and the dye 1,3,3'-triethyl-1H-imidazo[4,5-b]quino-oxacarbocyanine iodide.

4. A light-sensitive photographic silver halide emulsion containing silver halide and the dye 3-ethyl-5-[(1,3-diethyl - 1H-imidazo[4,5-b]quinol - 2(3H) - ylidene)ethylidene]-2-thio-2,4-oxazolidinedione.

5. A light-sensitive photographic silver halide emulsion containing silver halide and the dye 1-ethyl-5-[(3-ethyl-1 - phenyl - 1H -imidazo[4,5]quinol - 2(3H) - ylidene]ethylidene-2-thiobarbituric acid.

6. A light-sensitive photographic silver halide emulsion containing silver halide and the dye 5-[(3-ethyl-1-phenyl-1H - imidazo[4,5-b]quinol - 2(3H)-ylidene)ethylidene]-3-(2-sulfoethyl)-2-thio-2,4-oxazolidinedione.

7. A light-sensitive photographic element comprising a support having coated thereon at least one layer of the photographic emulsion of claim 1.

References Cited
UNITED STATES PATENTS

| | | | |
|---|---|---|---|
| 2,255,407 | 9/1941 | Brooker | 96—106 |
| 2,304,981 | 12/1942 | Wilmanns | 96—106 |
| 2,748,115 | 5/1956 | Brooker et al. | 96—106 |
| 2,870,014 | 1/1959 | Brooker et al. | 96—106 |
| 2,895,955 | 7/1959 | Haseltine et al. | 260—240.5 |
| 2,980,671 | 4/1961 | Nys et al. | 96—106 |
| 2,984,664 | 5/1961 | Fry et al. | 260—240.5 |
| 3,057,857 | 10/1962 | Siegel | 260—240 |

OTHER REFERENCES

Chemical Abstracts, vol. 52, page 16, 469, (1958).

Venkataraman, "Synthetic Dyes," vol. 2, page 1185, Academic Press, Inc., New York, (1952).

NORMAN G. TORCHIN, *Primary Examiner.*

J. T. BROWN, *Assistant Examiner.*

UNITED STATES PATENT OFFICE
CERTIFICATE OF CORRECTION

Patent No. 3,326,688                               June 20, 1967

Philip W. Jenkins et al.

It is hereby certified that error appears in the above numbered patent requiring correction and that the said Letters Patent should read as corrected below.

Column 2, between lines 23 and 24, insert -- 4,5-diphenyl-thiazole --; column 5, lines 18 to 20, the left-hand portion of the formula should appear as shown below instead of as in the patent:

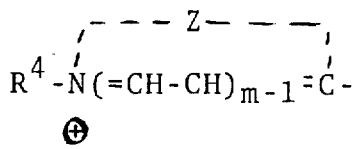

column 7, lines 55 to 63, the right-hand portion of the formula should appear as shown below instead of as in the patent:

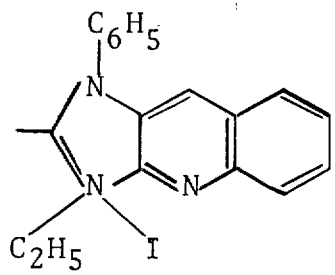

same column 7, lines 74 and 75, for "0.2 g.(7%), M.P. 263.5-264.5° C. dec." read -- 0.6 g. (32%), M.P. 264.5-266.5° C. dec. --.

Signed and sealed this 29th day of July 1969.

(SEAL)
Attest:

EDWARD M. FLETCHER, JR.                      WILLIAM E. SCHUYLER, JR
Attesting Officer                                Commissioner of Patents